United States Patent
Groening et al.

(10) Patent No.: US 7,560,835 B2
(45) Date of Patent: Jul. 14, 2009

(54) ELECTRICAL INDUCTION MACHINE AND PRIMARY PART

(75) Inventors: Ingolf Groening, Lohr am Main (DE); Christian Kaehler, Partenstein (DE)

(73) Assignee: Bosch Rexroth AG, Stuttgart (DE)

( * ) Notice: Subject to any disclaimer, the term of this patent is extended or adjusted under 35 U.S.C. 154(b) by 506 days.

(21) Appl. No.: 11/271,333

(22) Filed: Nov. 9, 2005

(65) Prior Publication Data
US 2006/0125338 A1    Jun. 15, 2006

(30) Foreign Application Priority Data
Nov. 16, 2004    (DE) .................. 10 2004 055 317

(51) Int. Cl.
*H02K 1/10* (2006.01)
*H02K 3/00* (2006.01)
*H02K 17/00* (2006.01)
(52) U.S. Cl. .................. 310/12; 310/166; 310/179
(58) Field of Classification Search ............ 310/166, 310/179, 186, 12
See application file for complete search history.

(56) References Cited

U.S. PATENT DOCUMENTS

| | | | |
|---|---|---|---|
| 4,752,707 A | 6/1988 | Morrill | 310/184 |
| 4,833,355 A * | 5/1989 | Kawashima | 310/198 |
| 5,642,013 A | 6/1997 | Wavre | 310/254 |
| 5,970,953 A | 10/1999 | Lorraine et al. | |
| 2002/0047460 A1* | 4/2002 | Yoneda et al. | 310/216 |
| 2004/0095035 A1* | 5/2004 | Sogabe et al. | 310/216 |

FOREIGN PATENT DOCUMENTS

| | | |
|---|---|---|
| DE | 197 48 593 | 5/1999 |
| DE | 100 56 038 | 5/2002 |
| DE | 101 19 642 A1 | 11/2002 |
| DE | 102 56 735 A1 | 12/2003 |
| DE | 103 39 232 A1 | 3/2004 |
| EP | 0 629 034 A2 | 12/1994 |
| EP | 1 315 274 A1 | 11/2001 |
| GB | 2 262 843 | 6/1993 |
| WO | WO 95/12912 | 5/1995 |
| WO | WO 98/01932 | 1/1998 |
| WO | WO 00/42315 | 7/2000 |
| WO | WO 01/48370 | 7/2001 |
| WO | WO 02/068813 | 9/2002 |
| WO | WO 02/068815 | 9/2002 |
| WO | WO 03/038267 | 5/2003 |
| WO | WO 03/054383 | 7/2003 |

\* cited by examiner

*Primary Examiner*—Burton Mullins
*Assistant Examiner*—David W. Scheuermann
(74) *Attorney, Agent, or Firm*—Kenyon & Kenyon LLP

(57) ABSTRACT

A primary part of an electrical induction machine, especially a synchronous motor or a linear motor, includes a plurality of modules which each have teeth situated in a row having at least partially encircling slots, in the slot of each tooth a coil is wound around this tooth, and the coils of a single module are connected to a single phase of a rotary current network. The number of modules in the primary part is equal to the number of current phases or an integral multiple thereof. A single module includes an uneven number of teeth but at least three teeth, and teeth directly adjacent to one another of a single module include coils that have an opposite winding direction, which generates an opposite magnetic field polarity at the teeth. An electrical induction machine, especially a synchronous motor or a linear motor, includes a primary part and a secondary part, working together with the primary part via an air gap, which may have permanent magnets as rotor magnets.

19 Claims, 8 Drawing Sheets

ELECTRICAL INDUCTION MACHINE AND PRIMARY PART

FIELD OF THE INVENTION

The present invention relates to a primary part of an electrical induction machine and also an electrical induction machine, especially a synchronous motor or a linear motor for machines in which highly synchronous operation is required.

BACKGROUND INFORMATION

Such machines are used, for example, in printing machines and grinding machines. Furthermore, highly synchronous operation properties are necessary in servo applications. In order to achieve highly synchronous operation, so as, for instance, to be able to position exactly for servo applications, it is especially necessary for the motor to have a low torque ripple. Ideally, an electric motor should supply a constant torque at each point in time. Torque ripple is a measure of to what extent the torque of the motor deviates from the average torque of the motor at a point t. Most often, the torque ripple is stated with reference to the average torque of the electric motor as a function of the rotor angle. If a motor has too high a torque ripple, a desired rotor position may not be controlled exactly. Furthermore, an electric motor should have a low leakage inductance and not a high saturation behavior. A low leakage inductance may be implemented especially by as great a distance apart of the teeth in the stator. This comes about because the magnetomotive force behavior is a function of the motor geometry and the situation of the coils. A low leakage inductance results in a low saturation behavior of the motor, which, in turn, opens up to the motor a high maximum rotary speed, and thus, in relation to the speed, a broad field of applications.

Electrical machines have mostly (at least) one stationary and one mobile main element. In rotating machines these are stators and rotors. In linear machines, such a subdivision into a stationary and a mobile main element does not exist, and therefore, in this case, the designations primary part and secondary part are used, which are quite customary even for rotating machines. In this connection, the primary part is the element that has an electrical rotating field applied to it. The secondary part, on the other hand, is the element that is excited electrically or by permanent magnets. In the following, the designation primary part will include the stator and the designation secondary part will include the rotor. As a rule, these main elements are constructed of laminated iron, and bear windings made of insulated copper conductors. The torque formation takes place electromagnetically by the force action on current-carrying conductors in a magnetic field.

What is important for this is the electric loading of the winding that carries the load current, and the magnetic flux density in an air gap between the primary part and the secondary part. Such machines are, for instance, asynchronous and synchronous machines. In particular we shall discuss below synchronous machines, and particularly synchronous motors. In synchronous motors, the electrically generated excitation field circulates in the primary part as a function of the speed. In the secondary part, for the most part, permanent magnets (but also direct current magnets) are mounted, and in the primary part three-phase windings are mounted for generating the rotational field. The subdivision of the current running to the primary part windings is performed as a function of the secondary part positional angle: the secondary part and the rotating field of the synchronous motor have the same speed.

A stator for an electrical induction machine, especially for a synchronous machine, is discussed in German patent document DE 101 19 642 A1, the teeth of the stator being detachably fastened in a yoke, which allows for winding the teeth outside of the stator and to mount them subsequently in the stator, in the mounted state of the motor, directly adjacent teeth having a different winding direction. In addition, the stator includes unwound auxiliary teeth. These configurations make allow for a simple mounting of the coils, but the synchronous motor has a high leakage inductance, and thus also a high saturation behavior.

U.S. Pat. No. 5,642,013 discusses a synchronous motor whose slot width and tooth clearance are adjusted to each other, for reducing the torque ripple, in such a way that, in this connection, a ratio of 0.40 to 0.55 sets in. This ratio can only be achieved without pole shoes, which gives the synchronous motor a high leakage inductance, and thus also a high saturation behavior, the coils about the teeth being oriented in such a way and being supplied with current during the operation of the motor in such a way that on respective diametrically opposite teeth a different magnetic field polarity is created and in each case three adjacent teeth form one pole of the stator, which endows the motor with a high torque ripple. Winding the stator takes place in such a way that always three teeth are wound simultaneously, using one wire guide.

For the reduction of the torque ripple of a synchronous motor, European patent document EP 1 315 274 A1 discusses a stator whose teeth or tooth modules (plurality of directly mutually adjacent teeth) are wound with coils in such a way that directly mutually adjacent elements, when supplied with current, have a different magnetic field polarity, the number of teeth or the number of modules being exactly twice the number of current phases used for the motor. In this motor, its high saturation behavior is a disadvantage. Furthermore, this document teaches an appropriate winding rule for the teeth or tooth modules, and a ratio of the pole pitch to the tooth (slot) pitch which may be used.

SUMMARY OF THE INVENTION

Therefore, an object of the exemplary embodiment and/or exemplary method of the present invention makes available an induction machine that is usable for the above-mentioned fields of application, and has a great linearity (torque curve plotted against current), a low leakage inductance (low saturation behavior and high maximum speed) and especially a low torque ripple. Furthermore, the motor should have a high force density (low unit volume), low cost and a low weight.

This object may be attained using an electrical induction machine whose ratio of tooth to tooth pitch is optimized while taking into consideration winding designs. According to the exemplary embodiment and/or exemplary method of the present invention, a primary part of the electrical induction machine, especially a synchronous or linear motor, has a plurality of toothed modules, a module including at least three teeth and, in each case, a slot running around a tooth, in which a coil is wound around the respective tooth, the coils of a single module being connected to a single phase of a three-phase current network. In the primary part of the exemplary embodiment and/or exemplary method of the present invention, the number of modules is equal to the number of current phases, or an integral multiple thereof. The winding design of a single module is executed in such a way that, in response to current flow through the coils of a single module, adjacent coils generate an oppositely polarized magnetic field.

In one exemplary embodiment, in this connection, in the case of directly adjacent teeth of two adjacent modules, the windings about these two teeth are executed in the same sense of rotation.

Using these configurations of the primary part, because of the winding design of the modules, one obtains ripples in the rotating field which, only at a high ordinal number (and therewith at a low amplitude) find a congruent ripple of a secondary subfield, which clearly reduces the torque fluctuations of the motor. In addition, the winding factors of the ripples are comparatively small, and the winding factor of the fundamental wave is very high. Overall, this leads to a high torque at low torque ripple. Furthermore, the cogging thrust may be minimized by an adjustment of the magnetic width (pole pitch) of the secondary part.

A winding of the primary part may be: P1, −P1, −P1, P1, P1, −P1; . . . ; Pm, −Pm, −Pm, Pm, Pm, −Pm or an integral multiple thereof. In this connection, m gives the number of current phases, a three-phase current may be used In an exemplary embodiment of the present invention of the primary part, the number of teeth is an integral multiple, which may be an even numbered multiple, of 9.

In another exemplary embodiment, the teeth of the primary part have pole shoes which at least partially close the slots which lie between the teeth on the side of the air gap of the motor. This brings about a sine-shaped curve of the induced voltage, which reduces the leakage inductance.

The totality of the above measures leads to a low distortion factor.

In an exemplary embodiment, the primary part has auxiliary teeth which are situated between two directly adjacent teeth. Auxiliary teeth increase the torque in the base load range, since more iron is available for the flux guidance, and consequently a shorter flux path via iron (greater μr than air) is available to the individual coils.

In another exemplary embodiment of the present invention, the ratio of a pole pitch of the secondary part to a tooth pitch of the primary part is equal to 9/8.

Motors for servo applications should position highly dynamically, for which a high overload capability at simple controllability and high linearity is required. Because of the low saturation behavior of the induction machine according to the exemplary embodiment and/or exemplary method of the present invention, a high linearity and a high overload capability come about. The low torque ripple achieved because of the tooth configuration and the winding configuration of the primary part permits a very simple positioning of the secondary part. Because of the low distortion factor, an automatic control unit is only minimally influenced by high flows of reverse waves, whereby the control quality of the induction machine, according to the exemplary embodiment and/or exemplary method of the present invention, is further increased.

Advantageous further embodiments of the present invention are described herein.

DETAILED DESCRIPTION

The following explanations relate especially to a synchronous motor, a rotor (secondary part) rotating within a stator (primary part). The exemplary embodiment and/or exemplary method of the present invention is meant also to include linear motors, asynchronous motors and also generators. Furthermore, the teeth responsible for the rotating field may point outwards, not as in the usual motors, where they point inwards, whereby either the stator of this motor lies inside, or the function of stator and rotor are exchanged. In the following, for rotary machines, the more usual expressions stator and rotor are used.

Figure 1:
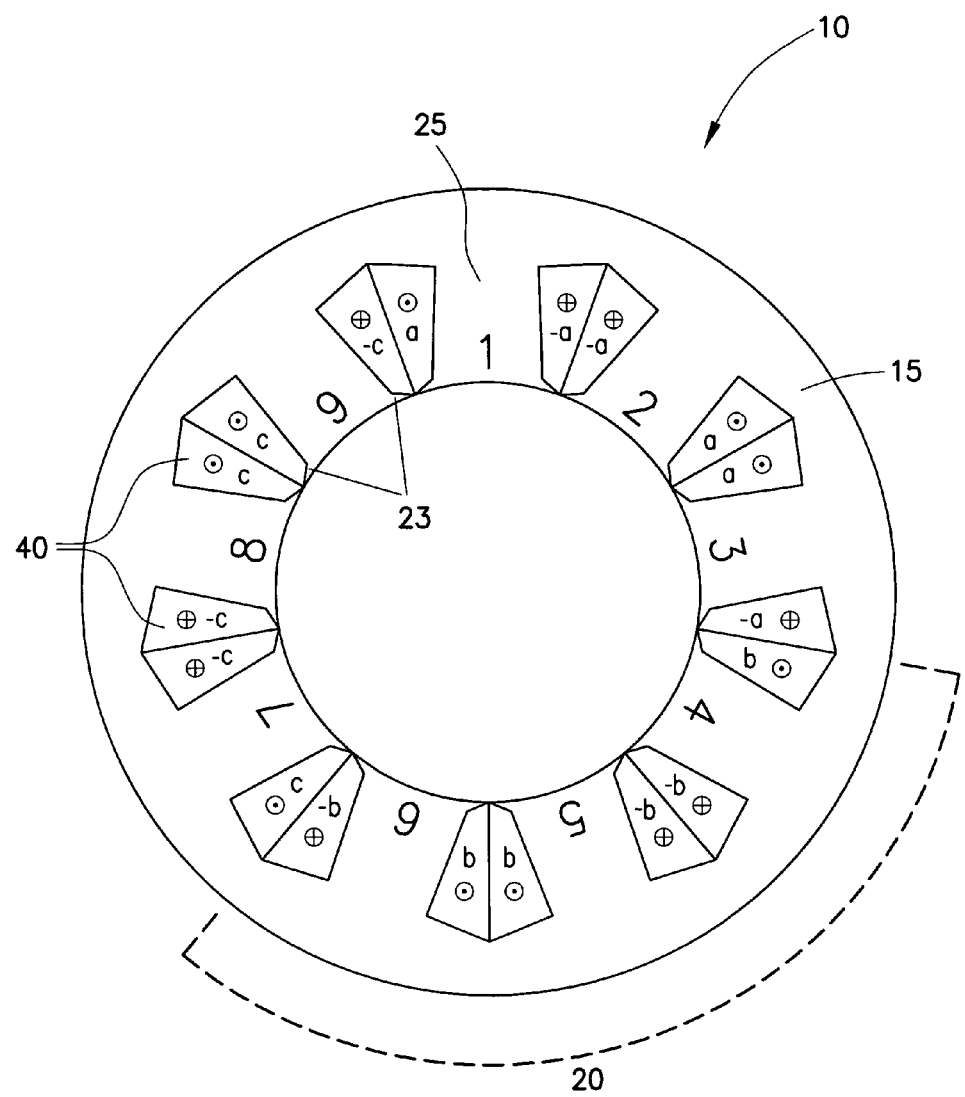
FIG. 1 shows an exemplary embodiment of a primary part, according to the exemplary embodiment and/or exemplary method of the present invention, of an electrical induction machine.

FIG. 1 shows a front view of a stator 10, according to the exemplary embodiment and/or exemplary method of the present invention, of an induction machine according to the exemplary embodiment and/or exemplary method of the present invention. In such a specific embodiment, stator 10 has 9 teeth 25, which are connected to one another via a yoke 15. Yoke 15 is cylindrical and the nine teeth 25 protrude inwards at the same angular distance apart from one another. The free ends of teeth 25 form a cylindrical space in which a rotor 100 is able to rotate. In this specific embodiment, teeth 25 are provided with pole shoes 23, which at least partially close the remaining intermediate space between two directly adjacent teeth, at the free end of teeth 25. Other specific embodiments of the exemplary embodiment and/or exemplary method of the present invention have no pole shoes 23.

Around each tooth 25 an encircling slot 40 is provided (see tooth 8, FIG. 1), in each of these encircling slots 40, coils 30 (see FIG. 5) being provided, which, in each case, during the operation of the motor, bring about a magnetic field that is changeable with time. In this specific embodiment, three teeth 25 that are situated directly adjacent to one another form a module 20, in this specific embodiment stator 10, according to the exemplary embodiment and/or exemplary method of the present invention, of the electrical induction machine having three modules 20, which include respectively teeth 1-3, 4-6 and 7-9. In other specific embodiments of stator 10 according to the exemplary embodiment and/or exemplary method of the present invention, however, more than three modules per stator 10 may be provided, or even each module 20 may have more than only three teeth 25, in the latter case, the number of teeth per module may be uneven.

In an exemplary embodiment of the present invention, stator 10 is constructed of a plurality of thin, single-piece ferromagnetic steel sheets (stator sheets), that have a profile as shown in FIG. 1. The entire stator 10 or an individual module 20 may be manufactured in one piece, or module 20 or teeth 25 may be assembled from sheets, in order to mount stator 10 after winding teeth 25 with coils 30.

Figure 2:
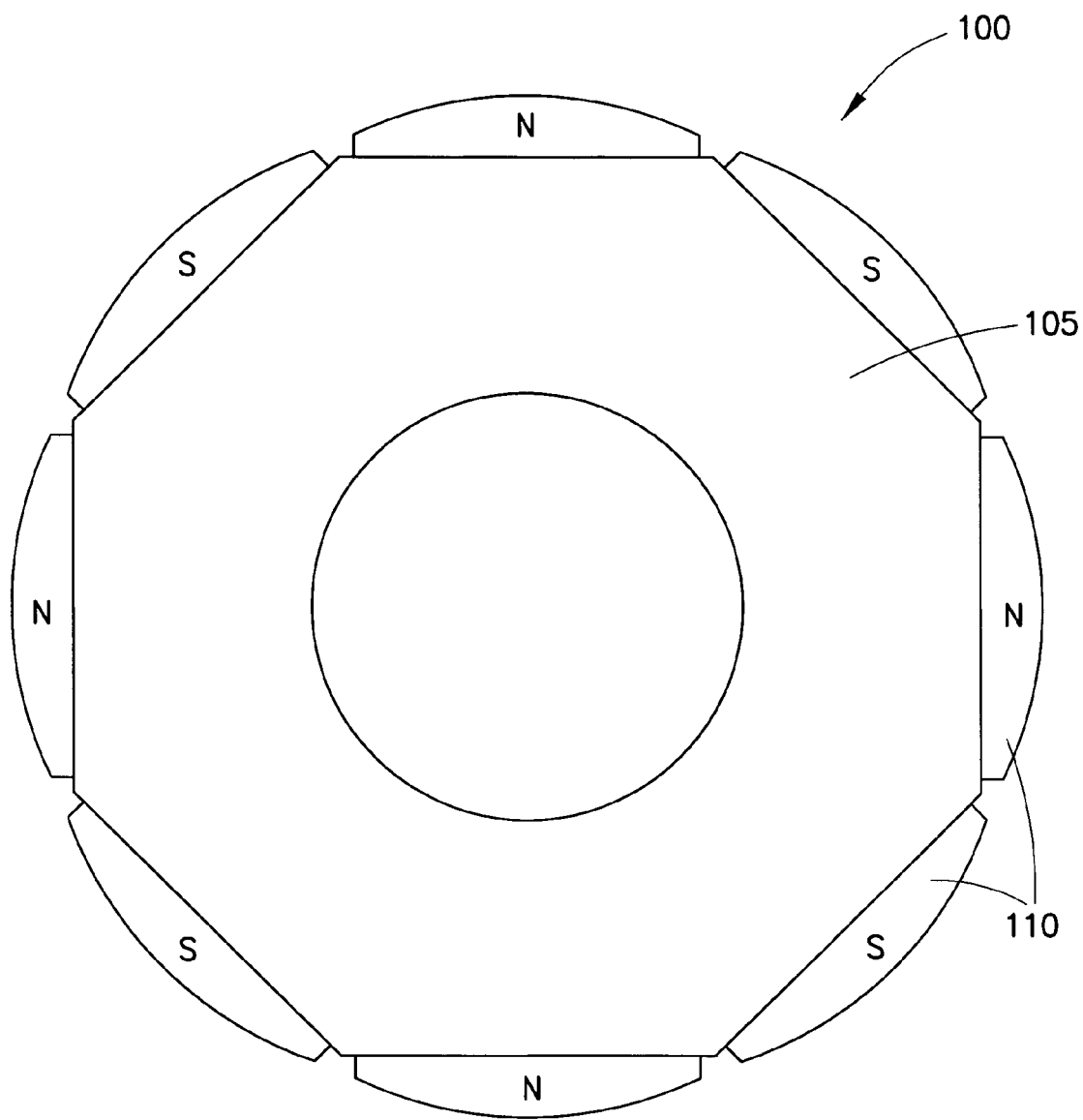
FIG. 2 shows a secondary part for the primary part from FIG. 1.

FIG. 2 shows a rotor 100 (known also as rotor, magnet wheel or inductor), which is supported rotatably in stator 10 according to the exemplary embodiment and/or exemplary method of the present invention. For an interference-free rotating of rotor 100 in stator 10, an air gap 120 (see FIG. 4) is provided between stator 10 and rotor 100. In an exemplary embodiment of the present invention, rotor 100 has permanent magnets as rotor magnets 110. These are regularly distributed at the circumference of cylindrical rotor 100, the rotor magnets 110 in each case having on the outside (and consequently also on the inside) a different magnetic polarization. Rotor magnets 110 may be provided on a shaft 105 which, same as stator 10, is constructed from ferromagnetic steel sheets. Furthermore, shaft 105 may be arranged in one piece, or, instead of permanent magnets as rotor magnets 110, to provide DC magnets.

Figure 3:
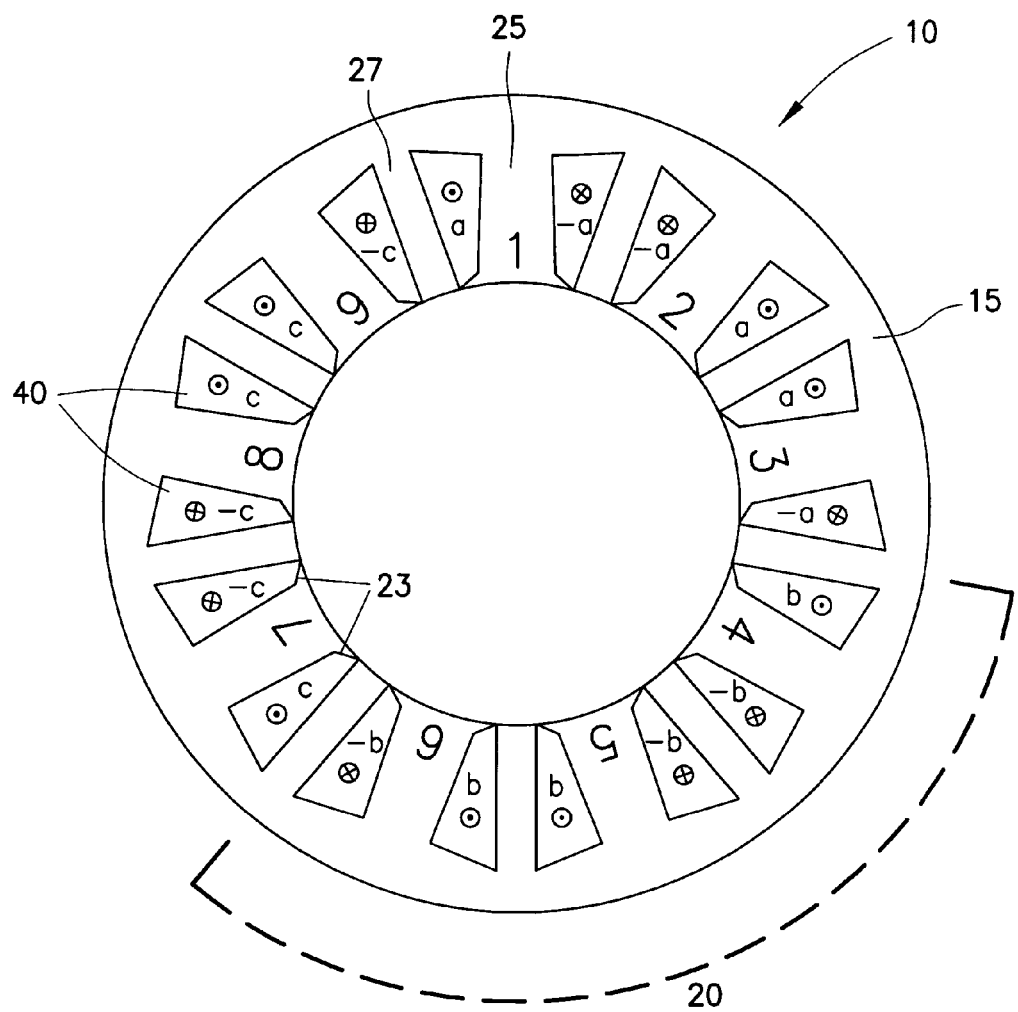
FIG. 3 shows another exemplary embodiment of a primary part, according to the exemplary embodiment and/or exemplary method of the present invention, for the electrical induction machine.

In FIG. 3, an exemplary embodiment of the present invention, in which, by contrast to the specific embodiment according to FIG. 1, between two directly adjacent teeth 25, in each case an auxiliary tooth 27 is provided. This specific embodiment is advantageous particularly in the range of low current strengths, since, in the base load range, there is more iron available for flux guidance.

Figure 4:
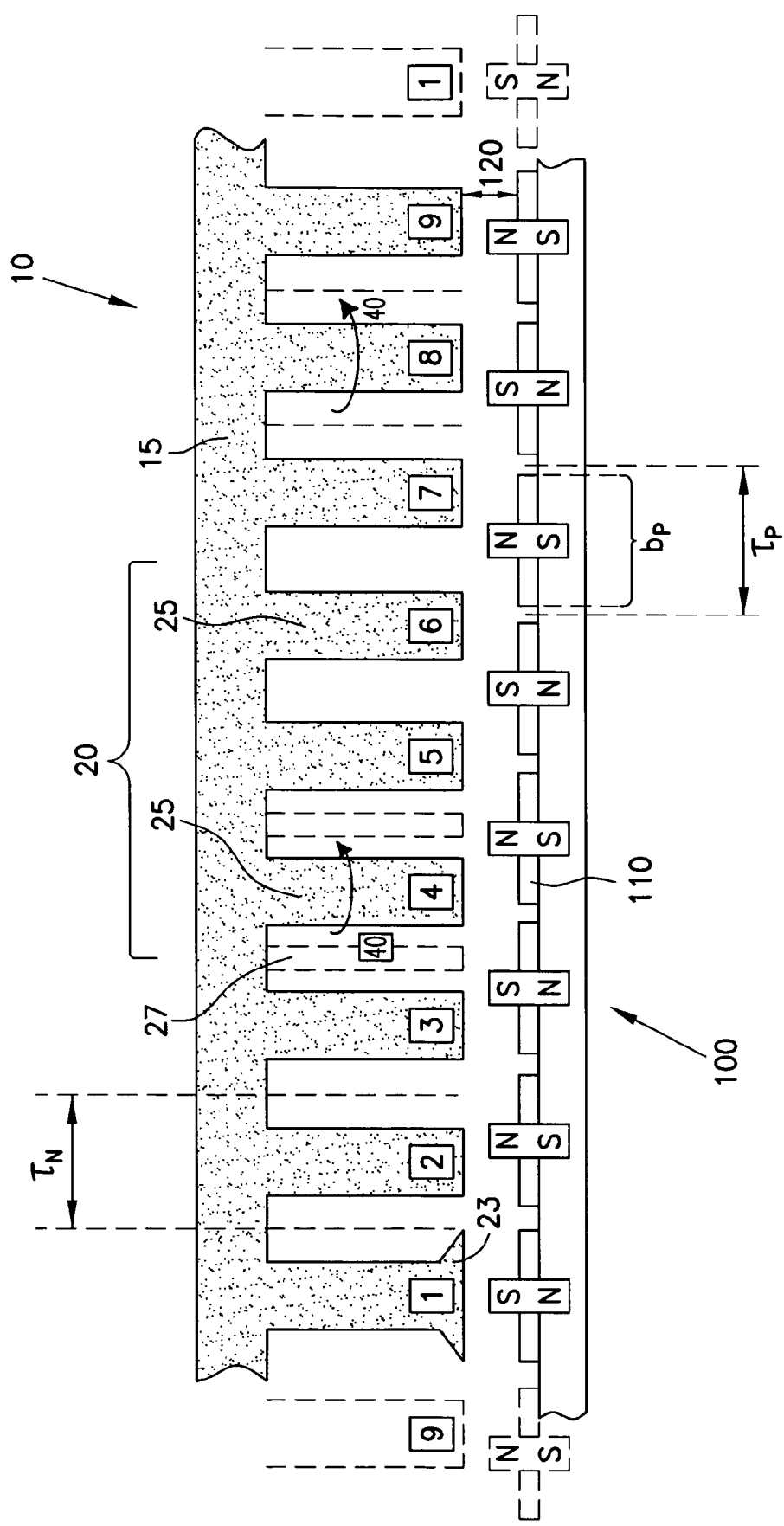
FIG. 4 shows a longitudinal section of an exemplary embodiment of a linear motor according to the present invention or a cut-open and unwound cross section of the specific embodiment as in FIG. 1.

FIG. 4 shows a stator 10, according to the exemplary embodiment and/or exemplary method of the present invention, of a linear motor or stator 10 of FIG. 1 in a cut-open and unwound representation, stator 10 working together with rotor 100 via air gap 120. In this specific embodiment, stator 10 has three modules 20, each having three teeth, so that stator 10 includes nine teeth 25. Opposite to these there are eight rotor magnets 110, which during operation of the motor, work together, via air gap 120, with the magnetic fields of stator 10, that occur at the free ends of teeth 25 and are changeable with time.

A decisive variable for the motor is the ratio of the pole pitch $\tau_P$ to the tooth pitch $\tau_N$. The pole pitch $\tau_P$ is a measure for the rotor magnets 110 that are distributed at the circumference of the rotor, pole pitch $\tau_p$ being a dimensionless or a dimension-encumbered value, having the unit [m], [°] or [rad], which represents the circumferential space requirement with reference to 360° (electric) of a rotor magnet 110 on rotor 100.

In this exemplary embodiment, pole pitch $\tau_p$ is in a dimensionless representation $\tau_p=1/8$. On the other hand, the tooth pitch $\tau_N$ is a measure for the space requirement of a coil 30 situated at the circumference of stator 10, which is situated in a slot 40 of a tooth. Similar to pole pitch $\tau_p$, tooth pitch $\tau_N$ indicates the circumference related space requirement of a coil 30 or a slot 40. In the present exemplary embodiment, tooth pitch $\tau_N$ also amounts to a dimensionless $\tau_N=1/9$. Consequently, the dimensionless ratio of pole pitch $\tau_p$ to tooth pitch $\tau_N$ for an electrical induction machine amounts to $\tau_p/\tau_N=9/8$, according to the preceding exemplary embodiments.

In general, one may calculate the dimensionless pole pitch 96 $_p$ using $\tau_p=1/(v'\pm 1)$, and the dimensionless tooth pitch $\tau_N$ using $\tau_N=1/V'$, the ratio of pole pitch $\tau_p$ to tooth pitch $\tau_N$ being calculated using $\tau_p/\tau_N=(V'\pm 1)$. In this connection, V' is calculated as $v'=n'*m$, where m is the number of current phases and n' is a natural number representing the number of modules 20 in stator 10.

Figure 5:
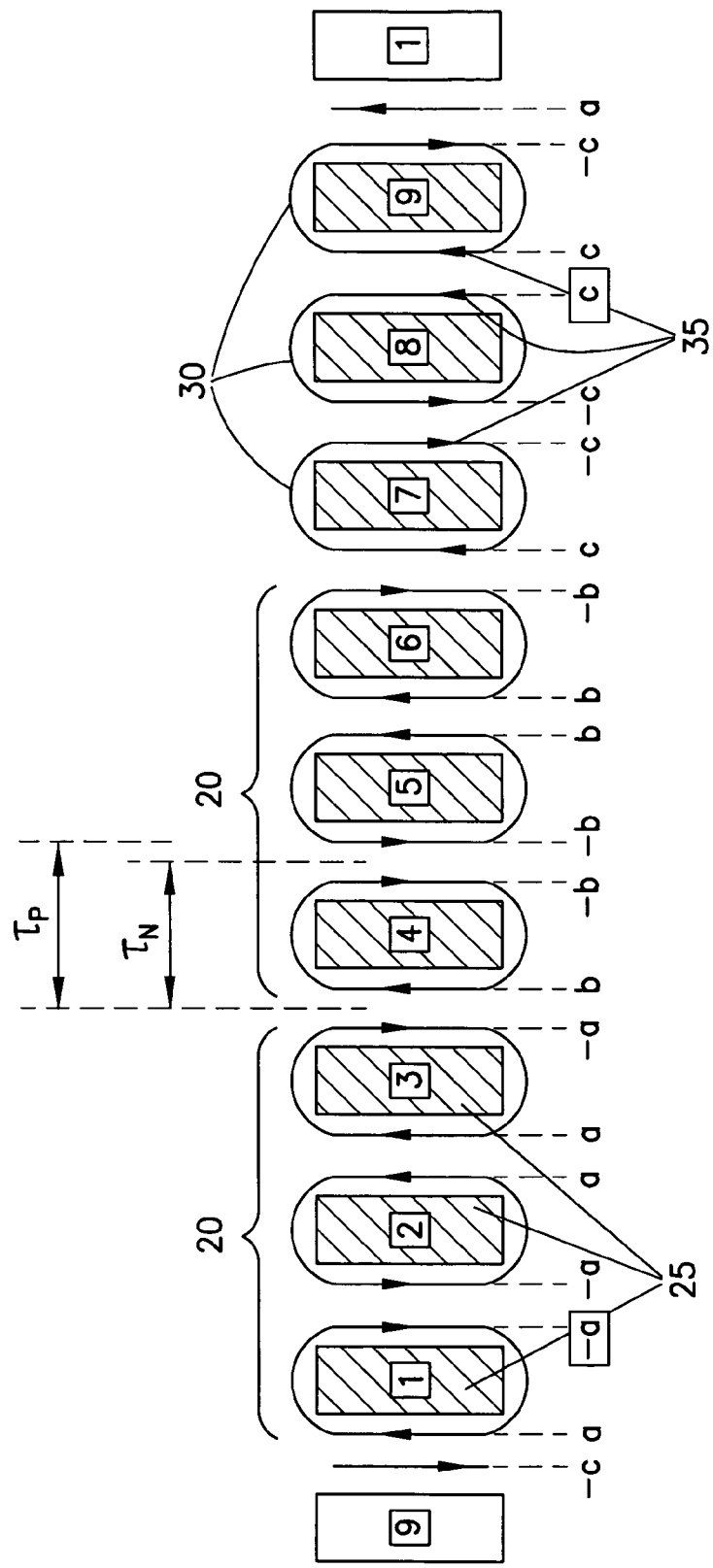
FIG. 5 shows a sectional view of FIG. 4 through the teeth of the primary part.

In the following, an exemplary embodiment of the present invention is explained in greater detail, in the light of FIGS. 4 and 5, FIG. 5 showing teeth 25 of stator 10 in cross section, and each tooth 25 having a coil 30 lying in its encircling slot 40. To make it better understood, in FIGS. 4 and 5, in each case next to tooth 1, tooth 9 is shown once more schematically, and to the right of tooth 9, tooth 1 is shown once more schematically. The same thing has been done with the corresponding rotor magnets 110. For the case of a rotating motor, this is supposed to demonstrate the circumferential connection between tooth 9 and tooth 1, or, for a linear motor, a repeating pattern.

Figure 6:
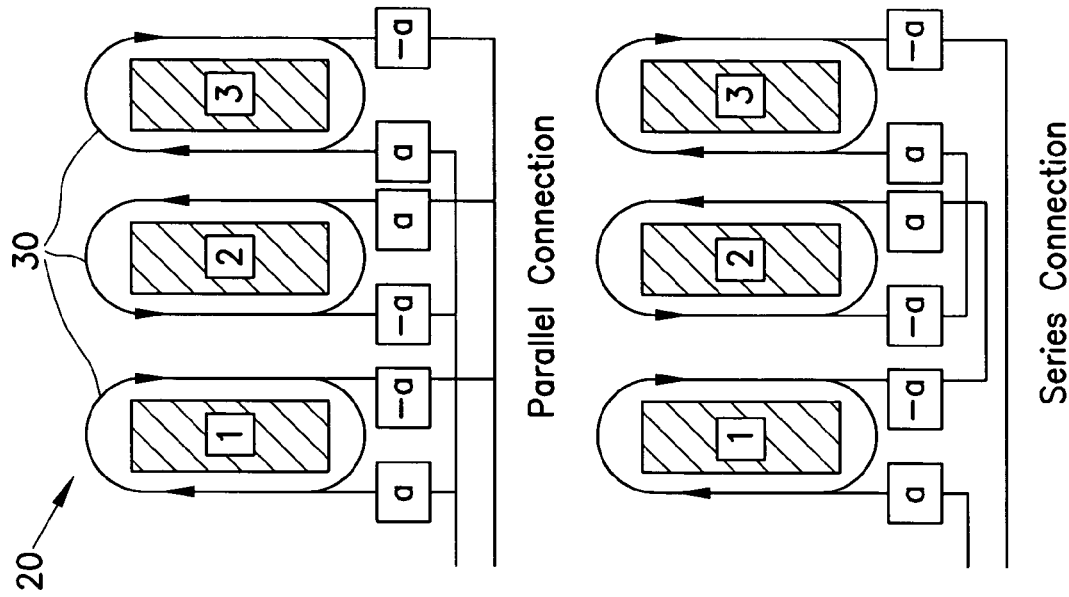
FIG. 6 shows three series connections and one parallel connection of coils of a module of the primary part.
Figure 6:
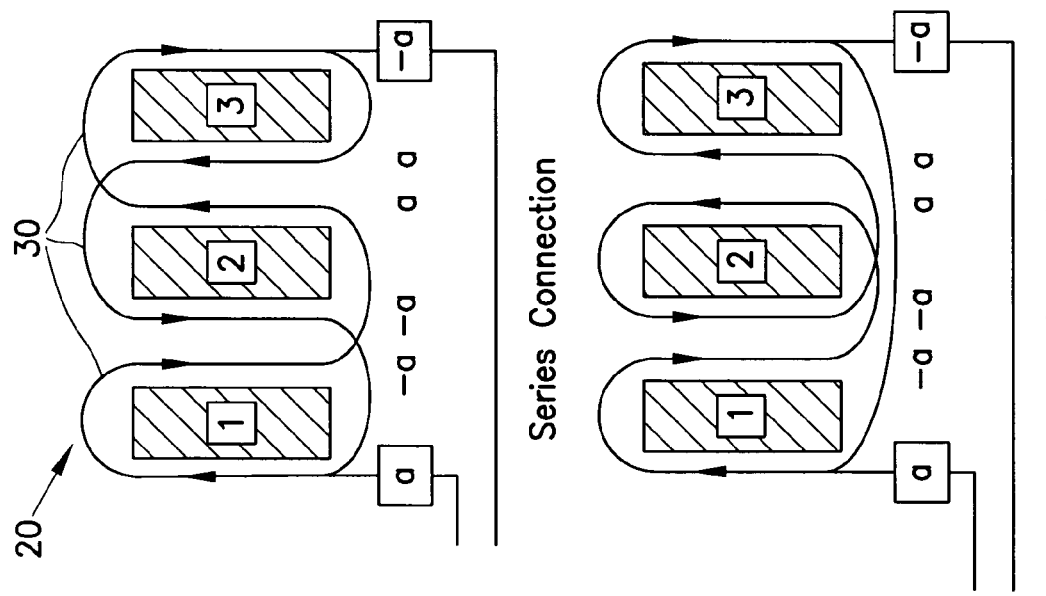

FIG. 5 shows a winding direction of coils 30 about teeth 1-9 of stator 10. In this instance, directly adjacent coils 30 respectively of a single module 20 have a different winding design 35. Thus, for example, coil 30 of tooth 1 is wound around it in the clockwise direction (as shown in FIG. 5), while coil 30 of tooth 2 is wound around the latter in an anticlockwise direction. Tooth 3, in turn, has a clockwise coil winding. These three coils 30 of module 20 are now connected to one single phase (in this case current phase a) of a rotary current (in this example a three-phase current). This may occur, for example, according to a parallel connection or one of three series connections, as in FIG. 6. Coil connections of coils 30 that are technically simple to implement are those in which, in each case, a tooth 25 is able to be wound independently of the other teeth 25. This allows, for instance, the winding of teeth 25 separately from one another before the assembly of stator 10, which may be done simply and automatically. Connecting coils 30 that are wound around teeth 25 then subsequently takes place during the assembly of stator 10. Such specific embodiments may be seen at the right of FIG. 6.

The same current phase is now applied to coils 30 of teeth 1-3, whereby, because of the different winding design of two directly adjacent coils 30, an oppositely polarized magnetic field develops at the core (tooth) of the two coils 30. Thus, for example, at point in time t, coil 30 of tooth 1 may generate a north pole at the free end of this tooth, whereas coil 30 of tooth 2 generates a south pole at the free end of this tooth. Then tooth 3, in turn, has a north pole at its free end, because of coil winding 35. In the case of an opposite voltage in phase a, opposite magnetic field polarities to the ones above then develop at the corresponding teeth 25 of this module 20.

The treatment of second module 20 (teeth 4-6) of stator 10 is exactly the same, these coils 30 being connected to another current phase b. Third module 20 (teeth 7-9) is treated exactly the same, which are then at current phase c of the three-phase current.

Figure 7:
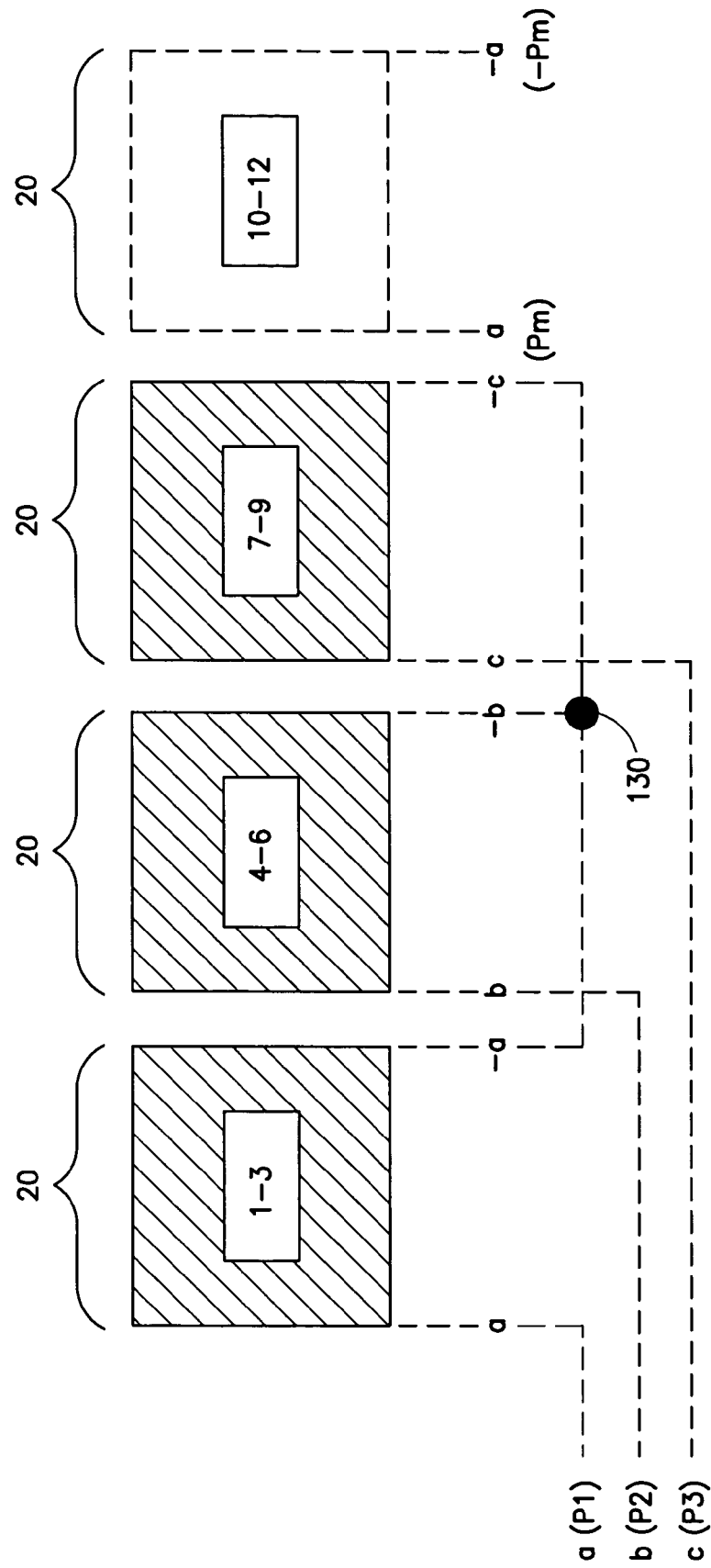
FIG. 7 shows a connecting circuit diagram of the electrical induction machine as in FIG. 1, according to the exemplary embodiment and/or exemplary method of the present invention.

Each module is connected to a different current phase Pm, Pm showing the current phase (in the previous example a, b and c), and m the number of phases. This is shown, for example in FIG. 7, modules 20 being shown in each case as a box. The electrical induction machine according to a first specific embodiment, having its nine teeth 1-9, which are uniformly divided among three modules 20, is shown in FIG. 7, in a cross hatched manner, the first module (teeth 1-3) being connected to phase P1=a, the second module (teeth 4-6) being connected to phase P2=b, and the third module 20 (teeth 7-9) being connected to phase P3=c of a three-phase current, and in each case last coil 30 of last tooth 25 of a module 40 (teeth 3, 6 and 9) being connected to a neutral point 130 of a star connection. In FIG. 7, additional modules 20 are also indicated (broken line box) which implement other specific embodiments of the present invention having three-toothed modules 20, but have a different number of current phases.

According to the exemplary embodiment and/or exemplary method of the present invention, it is possible either to repeat the preceding pattern of the three modules 20 according to FIG. 7 and, in turn, connect them in each case to current phases a, b and c of the three-phase current (suitable for a linear motor), or one may connect the additional modules 20 to additional current phases of a multi-phase current. Now, if one has a four-phase current, the electrical induction machine should have at least four modules 20, or an integral multiple thereof, each individual module 20, in turn, being connected to a current phase Pm. Furthermore, an individual module 20 may have not only three teeth 25, but four or more. A motor having such modules 20 may also be connected, according to the exemplary embodiment and/or exemplary method of the present invention, to a rotary current network as in the above variants. The exemplary embodiments of the present invention may include modules 20 having an odd number of teeth 25, however having an even number of teeth 25 in stator 10. This comes about, for example, in the case of a tooth number of three per module and a module number of six. What is advantageous, then, about such a specific embodiment is a rotary current having three phases, in each case one phase being present at two modules 20.

In FIG. 5, for a simplified illustration of winding design. 35 of a coil 30 about a tooth 25, the winding direction is shown by a plus (+) and a minus (−) before the current phase a, b, c connected to coil 30. In winding design 35 of a coil 30, it is only decisive how the windings of coil 30 are executed relative to one another. Therefore, a nomenclature may be arbitrarily selected, as long as it uses different designations for different winding designs 35 (clockwise/anticlockwise). According to FIG. 5, a positive sign means that the coil wire (always according to FIG. 5) is run from bottom to top (as the corresponding arrow shows), while a negative sign means that the coil wire is run from top to bottom.

The current phases of a rotary current are sine-shaped and have a basic frequency component $\cos(\omega \cdot t - \alpha)$, each rotary current phase Pm rotating at a speed of $\omega$[rad/s]. and each rotary current phase Pm is displaced from the next one by an angle $\alpha$, which, for instance, in a three-phase rotary current amounts to 120° or $2\pi/3$ rad. For the exemplary three-phase network this means for current and for voltage at any desired point in time t, that phase a behaves according to $\cos(\omega \cdot t)$, phase b behaves according to $\cos(\omega \cdot t - 2\pi/3)$, and phase c behaves according to $\cos(\omega \cdot t - 4\pi/3)$. These phase currents Pm run through the respective coil windings 35 and generate a magnetic flux in stator 10, which essentially at right angles meets air gap 120 that is provided between stator 10 and rotor 100. The magnetic field that also changes with time based on the current changing with time acts together with rotor magnets 110 in such a way that rotor 100 rotates (and in the case of a linear motor moves linearly), and outputs a torque (or moves the rotor with a force in a linear direction). Ideally, in this connection, the magnetic field of the rotor is phase-shifted by 90° to the dynamic magnetic field of stator 10, which leads to a maximum force transmission.

Because of the stator 10 geometry and winding embodiment 35 according to the exemplary embodiment and/or exemplary method of the present invention, a congruent ripple of the rotor field exists in the ripples generated by the rotary field only at a high harmonic number, and consequently at a small amplitude. These undesired forces on rotor 10 are small because of the small amplitude of the ripple, which greatly reduces the torque ripple of the motor.

Figure 8:
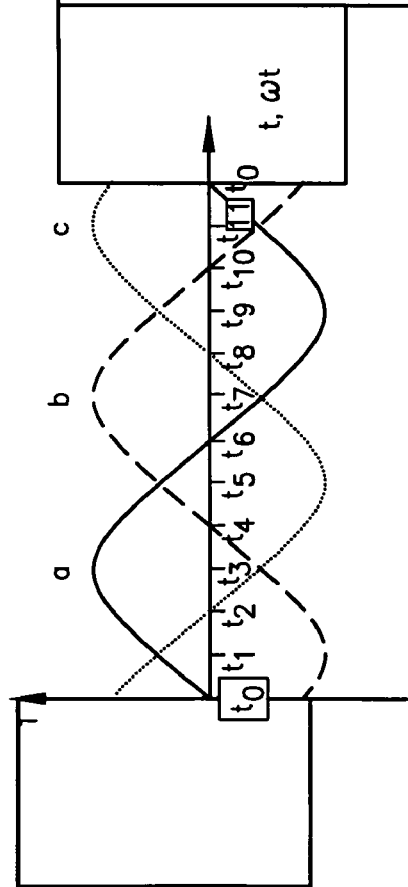
FIG. 8 shows the magnetic polarizations created at the module teeth, at different points in time $t_0$ to $t_{11}$, in connection with a three-phase current diagram according to the exemplary embodiment as in FIG. 1.

FIG. 8 may be examined for a better understanding of the magnetic field developing in stator 10 and changing with time. In the left part of the phase diagram, FIG. 8 shows a three-phase current having current phases a, b and c, which are displaced by 120° with respect to one another. A three-phase current is shown here, again, in an exemplary fashion, a different multi-phase current may be used. Next to it, on the right, in the form of a table, there is shown the magnetic polarization of the individual teeth 25 of the three modules 20.

At a point in time $t_0$, at a first module 20 (teeth 1-3) there is present neither current nor voltage, so that no magnetic field is being produced by coils 30. At second module 20 (teeth 4-6) there is a negative voltage at time $t_0$, which then brings about, based on winding embodiment 35 of coils 30 of this module 20 a south pole at tooth 4, a north pole at tooth 5, and again, a south pole at tooth 6, and, because of the current not yet having reached its maximum value, the poles are not yet fully developed (which is true for the second module only at $t_1$). At the third module (teeth 7-9), on the other hand, at point to there is a positive voltage, which generates a north pole at tooth 7, a south pole at tooth 8 and again a north pole at tooth 9, which, similarly to module 2, have not yet reached their maximum value.

At point $t_1$, all voltages, and thus also all currents, of phases a, b and c have a value different from 0, so that in each of the nine teeth a more or somewhat less strong magnetic field is revealed, which may be read off at line $t_1$, in the table of FIG. 8. In this connection, at teeth 1-3 of the first module, there is developed a weak north pole, a weak south pole and again a weak north pole, whereas by contrast at teeth 4-6 of the second module a maximum south pole, a maximum north pole and again a maximum south pole develops, and, at teeth 7-9 of the third module, a weak north pole, a weak south pole and again a weak north pole develops. In this connection it may be seen that, at tooth 1 as well as at tooth 9 respectively a north pole develops, which, in the synchronous machine, lie next to each other and act as a north pole, so that stator 10 according to the exemplary embodiment and/or exemplary method of the present invention develops eight poles at time $t_1$. The eight rotor magnets 110 of rotor 100 now lie opposite these eight poles.

This configuration having eight poles in stator 10 develops at each time t of the operation of the motor, except for the corresponding zero crossings. Thus, at point t3, a common south pole develops at tooth 6 and tooth 7, at point $t_5$, a common north pole develops at tooth 3 and tooth 4, at point $t_7$, a common south pole develops at tooth 1 and tooth 9, at point $t_9$, a common north pole develops at tooth 6 and tooth 7, and at point $t_{11}$, a common south pole develops at tooth 3 and tooth 4. Of special advantage is an electrical induction machine whose stator 10 has an even numbered multiple of nine teeth 25, such as 18 or 36 teeth 25. In such a specific embodiment, these "double poles" that are created lie diametrically opposite from each other, whereby this geometrical irregularity may be compensated for. Moreover, for instance, specific embodiments of the present invention may have five teeth 25 per module 20, for example, 30 teeth 25 being provided in stator 100 of the exemplary embodiment and/or exemplary method of the present invention.

In order to provide an approximate idea of the strength of the magnetic field in the table of FIG. 8, weak magnetic fields are shown by lower case letters, somewhat stronger magnetic fields by bold lower case letters and the maximum magnetic field of each tooth 25 in bold capital letters.

Furthermore, it should be noted that always only "double poles" develop which result from weak magnetic field polarities of the same kind, which is shown once in exemplary fashion in the table in FIG. 8, by the grey box. At all other times, similarly only such weak "double poles" develop whereby the geometrical asymmetry does not have a strong effect.

The following is the List of Reference Symbols:
P (rotary) current phase, in general
m number of current phases
a current phase (of a three-phase current)
b current phase (of a three-phase current)
c current phase (of a three-phase current)
n natural number
n' natural number
v' [=n'*m]
$b_p$ magnetic width (pole pitch)
$\tau_N$ tooth pitch [=1/v']
$\tau_P$ pole pitch [=1/(v'±1)]
1-9 tooth
10 primary part, stator
15 yoke
20 module
23 pole shoe
25 tooth (in general)
27 auxiliary tooth
30 coil
35 winding embodiment (design), coil winding
40 slot
100 secondary part, rotor
105 shaft
110 rotor magnet (which may be a permanent magnet)
120 air gap
130 star point

What is claimed is:

1. A primary part of an electrical induction machine, comprising:
a plurality of modules, each having teeth situated in a row, and having at least partially encircling slots;
wherein:
in the slot of each tooth a coil is wound around the tooth, and the coils of a single module are connected to a single phase of a rotary current network,
the number of modules in the primary part equals the number of current phases or an integral multiple thereof,
a single module includes an uneven number of teeth, the uneven number of teeth being at least three teeth,
teeth, directly adjacent to one another, of a single module include coils having an opposite winding direction, which generates an opposite magnetic field polarity at the teeth,
a last coil of a last tooth of each single module is connected to a neutral point of a star connection,
at least one weak double pole is created by adjacent teeth of adjacent modules, the at least one double pole resulting from weak magnetic field polarities of the same kind, the weak magnetic field polarities being less than a maximum amplitude of the magnetic field.

2. The primary part of claim 1, wherein the teeth, directly adjacent to one another, of two of the modules include coils that have a winding direction in the same direction.

3. The primary part of claim 1, wherein a dimensionless tooth pitch of the primary part is determined according to the formula $\tau_N=1/v'$, where $v'=n'*m$, and where m is the number of current phases (Pm) and n' is a natural number.

4. The primary part of claim 1, wherein a winding design of the primary part is one of: (P1/−P1), [(−P1/P1), (P1/−P1)]$_{n\text{-}fold}$; . . . ; (Pm/−Pm), [(−Pm/Pm), (Pm/−Pm)]$_{n\text{-}fold}$, an integral multiple thereof, and an electromagnetically invariant equivalent thereof, where n is a natural number.

5. The primary part of claim 1, wherein the winding arrangement of the primary part is: (a/−a), (−a/a), (a/−a); (b/−b), (−b/b), (b/−b); (c/−c), (−c/c), (c/−c); or an integral multiple thereof; or a winding arrangement being electromagnetically invariant to the foregoing winding arrangements.

6. The primary part of claim 1, wherein the number of the teeth of the primary part is an odd or even numbered integral multiple of nine or fifteen.

7. The primary part of claim 1, wherein an auxiliary tooth is situated in each case between two directly adjacent teeth of the primary part.

8. The primary part of claim 1, wherein the slots in a region of a free end of the teeth are at least partially closed by pole shoes.

9. An electrical induction machine, comprising:
a primary part of the electrical induction machine, including:
a plurality of modules, each having teeth situated in a row, and having at least partially encircling slots;
wherein:
in the slot of each tooth a coil is wound around the tooth, and the coils of a single module are connected to a single phase of a rotary current network,
the number of modules in the primary part equals the number of current phases or an integral multiple thereof,
a single module includes an uneven number of teeth, the uneven number of teeth being at least three teeth,
teeth, directly adjacent to one another, of a single module include coils having an opposite winding direction, which generates an opposite magnetic field polarity at the teeth,
a last coil of a last tooth of each single module is connected to a neutral point of a star connections,
at least one weak double pole is created by adjacent teeth of adjacent modules, the at least one double pole resulting from weak magnetic field polarities of the same kind, the weak magnetic field polarities being less than a maximum amplitude of the magnetic field; and
a secondary part acting together with the primary part via an air gap.

10. The induction machine of claim 9, wherein a ratio of a pole pitch ($\tau_p$) of the secondary part to a tooth pitch ($\tau_N$) of the primary part is $\tau_P/\tau_N=v'/(v'\pm1)$.

11. The induction machine of claim 9, wherein a ratio of a pole pitch ($\tau_p$) to a tooth pitch ($\tau_N$) is $\tau_P/\tau_N=9/8$.

12. The induction machine of claim 9, wherein a number of electrical phases P is equal to three.

13. The primary part of claim 1, wherein the induction machine is a synchronous motor or a linear motor.

14. The induction machine of claim 9, wherein the induction machine is a synchronous motor or a linear motor.

15. The induction machine of claim 9, wherein the rotor magnets include permanent magnets.

16. The induction machine of claim 9, wherein a winding design of the primary part is one of: (P1/−P1), [(−P1/P1), (P1/−P1)]$_{n\text{-}fold}$; . . . ; (Pm/−Pm), [(−Pm/Pm), (Pm/−Pm)]$_{n\text{-}fold}$, an integral multiple thereof, and an electromagnetically invariant equivalent thereof, where n is a natural number.

17. The induction machine of claim 9, wherein the winding arrangement of the primary part is: (a/−a), (−a/a), (a/−a); (b/−b), (−b/b), (b/−b); (c/−c), (−c/c), (c/−c); or an integral multiple thereof; or a winding arrangement being electromagnetically invariant to the foregoing winding arrangements.

18. The induction machine of claim 9, wherein the rotor magnets include DC magnets.

19. The induction machine of claim 9, wherein a magnetic field of the secondary part is phase-shifted by 90 degrees to a dynamic magnetic field of the primary part, thereby leading to a maximum force transmission.

* * * * *